No. 769,645.

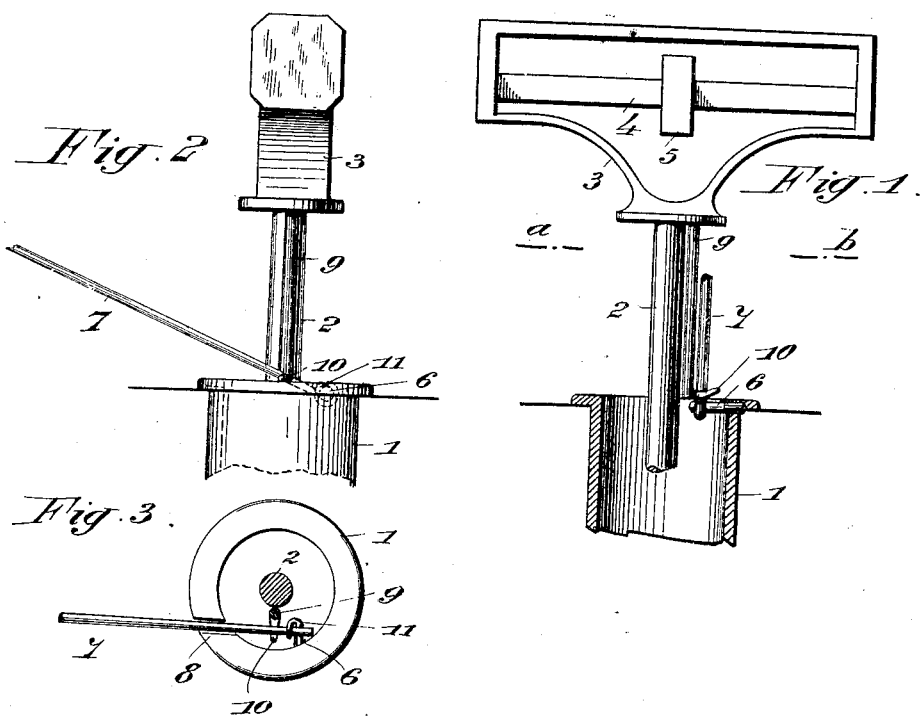

Patented September 6, 1904.

UNITED STATES PATENT OFFICE.

OCTAVE NICOLAS HENRI JOSEPH BROTELLE, OF COURCELLES, BELGIUM.

WEIGHING-SCALE.

SPECIFICATION forming part of Letters Patent No. 769,645, dated September 6, 1904.

Application filed February 15, 1902. Serial No. 94,258. (No model.)

*To all whom it may concern:*

Be it known that I, OCTAVE NICOLAS HENRI JOSEPH BROTELLE, a subject of the King of Belgium, and a resident of Courcelles, Belgium, have invented certain new and useful Improvements in Weighing-Scales, of which the following is a specification.

The object of this invention is to overcome a certain defect generally inherent in weighing-scales, and is more particularly applicable to the type known as "Roberval" scale. This defect consists in that the freeing of the scales of these balances takes place too rapidly—*i. e.*, at the very moment when equilibrium is established—without the weigher being warned of the approaching moment of equilibrium. The weigher will therefore be liable to put on overweight in merchandise upon the scale.

Now it is the object of this invention to avoid the aforesaid objection by the combination of a pointer or indicator with each support of the scale-pans and for this purpose to provide means which will enable either the pans or some movable part thereof to actuate the said pointers or indicators. In this manner the operator will be apprised of the approaching moment of equilibrium. The known weight of this pointer or indicator acts on the pan containing the merchandise so as to cause the said pan to oscillate with the balance-beam and the general pointer immediately a predetermined slightly smaller weight than the correct weight has been reached. The loss in weight through the action of the indicator is, however, compensated at the moment the exact balance is established, so as to prevent the wrong weight being given. I attain these objects by the means illustrated in the accompanying drawings, in which—

Figure 1 is a face view of the buckle of a Roberval scale. Fig. 2 is a side view of the same with the indicator in an elevated position. Fig. 3 is a horizontal section taken above the stop. Fig. 4 is a diagram showing the two vertical suspension-rods of the buckles within the stops and in a position of equilibrium.

Similar figures denote similar parts throughout the several views.

Referring to Figs. 1, 2, and 3, the stop 1 is formed by the bed of the scale and permits in the usual way passage to the rod 2, carrying the buckle 3, in which engages the knife-edge 4 of the balance-beam 5. According to my invention I mount in the opening of the stop 1 a pivot 6, upon which a lever 7 or indicator can freely oscillate. The said indicator reposes normally in a horizontal position in a groove 8 in the upper part of the stop 1. Further, I mount on the side of the rod 2, carrying the buckle 3, a small rod 9, terminating in a hook 10, adapted to engage beneath the indicator 7 and lift the same into the elevated position (shown in Figs. 1 and 2) when the corresponding pan is in its highest position. The arrangement is identical for each pan of the scale, so that when the scale is in equilibrium, as indicated at Fig. 4, the two indicators 7 will both be horizontal. When, however, the one of the pans rests on its stop, the corresponding indicator will be in a horizontal position, while the other indicator in connection with the other pan now elevated will be lifted by the hook, as shown in Figs. 1 and 2.

In order to prevent any jerky motion of the scale to so act on the corresponding indicator 7 as to project it suddenly beyond the position it would occupy when simply reposing upon the hook 10, the pivot 6 may advantageously be fitted with a small stop 11 in any convenient manner so as to extend into the path of oscillation of the indicator, as shown in Fig. 3, and thus limit its stroke upwardly.

The scale thus completed and improved operates in the following manner: The two indicators have an exactly-predetermined position, and it will be readily understood that the lifted indicator, in connection with the elevated pan, will produce upon such pan an action which reduces in a corresponding manner the effect of the weights placed in the other pan. The result from this is that if the said indicator weighs, for example, ten grams and the correct balance of the merchandise is established less the weight of ten grams the pan will tend to move to the position of equilibrium. The operator will consequently be apprised before the exact weight is obtained by the lowering of the indicator corresponding to the pan on which the merchandise is weighed. As, however, at the moment of perfect equilibrium the indicator 7 is returned into the groove 8 in the stop 1, it ceases to have any action upon the pan, and thus the operator can rely on the accuracy of the weighing operation, as the weight of the merchandise will necessarily correspond to the weight on the scale-pan. By this arrangement, therefore, when the weight on the two pans approaches the point of equilibrium, whether testing weights or weighing merchandise, the operator will be informed by the lowering of the indicator. Moreover, if by inadvertence or negligence an excess of weight is produced upon one of the pans the corresponding indicator of the other pan will be caused to indicate, by rising in one case or by its immobility in the other case, whether the difference is above or below a predetermined weight. Thus two distinct advantages are obtained by a simple, practical, and economical means which cannot in any way interfere with the general sensibility of the scale.

A slightly-modified form of construction according to my invention, as shown in Figs. 5 and 6, has the extra advantage that it can be applied to a Roberval scale by any unskilled person.

What I claim, and desire to secure by Letters Patent of the United States, is—

In a weighing-scale the combination with the stop and the oscillating beam thereof, a rod depending from said beam and having its lower end provided with a hook, the stop at its upper end having a pivot-pin, an indicating-arm secured to said pin, said rod-hook engaging the under side of said arm at a point to one side of the pivot-pin, said stop having an opening therein to receive said arm, said rod-hook being intermediate said stop-opening and pivot-pin.

In testimony whereof I affix my signature in presence of two witnesses.

OCTAVE NICOLAS HENRI JOSEPH BROTELLE.

Witnesses:
C. SCHERI,
GREGORY PHELAN.